United States Patent
Dahmen

(10) Patent No.: US 10,060,287 B2
(45) Date of Patent: Aug. 28, 2018

(54) PRESSURE RELIEF DOOR ASSEMBLY

(71) Applicant: ROHR, Inc., Chula Vista, CA (US)

(72) Inventor: Angelica Dahmen, San Diego, CA (US)

(73) Assignee: ROHR, INC, Chula Vista, CA (US)

( * ) Notice: Subject to any disclaimer, the term of this patent is extended or adjusted under 35 U.S.C. 154(b) by 83 days.

(21) Appl. No.: 14/795,392

(22) Filed: Jul. 9, 2015

(65) Prior Publication Data

US 2017/0009599 A1  Jan. 12, 2017

(51) Int. Cl.
| | | |
|---|---|---|
| *F01D 21/14* | (2006.01) | |
| *B64C 7/02* | (2006.01) | |
| *B64D 29/00* | (2006.01) | |
| *E05B 41/00* | (2006.01) | |
| *E05B 65/10* | (2006.01) | |
| *E05C 17/36* | (2006.01) | |
| *F01D 25/00* | (2006.01) | |

(Continued)

(52) U.S. Cl.
CPC .............. *F01D 21/14* (2013.01); *B64C 7/02* (2013.01); *B64D 29/00* (2013.01); *E05B 41/00* (2013.01); *E05B 65/102* (2013.01); *E05C 17/36* (2013.01); *F01D 25/00* (2013.01); *F02C 7/00* (2013.01); *F02C 7/32* (2013.01); *F05D 2220/323* (2013.01); *F05D 2230/72* (2013.01); *F05D 2250/75* (2013.01); *F05D 2260/30* (2013.01); *F05D 2260/38* (2013.01); *F05D 2260/80* (2013.01)

(58) Field of Classification Search
CPC ........... F01D 21/14; F01D 25/00; B64C 7/02; B64D 29/00; E05B 41/00; E05B 65/102; Y10T 292/0908; Y10T 292/0909
See application file for complete search history.

(56) References Cited

U.S. PATENT DOCUMENTS

| | | | | |
|---|---|---|---|---|
| 4,230,352 A | * | 10/1980 | Sealey | ................. E05B 65/102 292/18 |
| 4,825,644 A | | 5/1989 | Bubello et al. | |

(Continued)

FOREIGN PATENT DOCUMENTS

| | | |
|---|---|---|
| DE | 19510758 A1 | 9/1996 |
| EP | 1197619 A1 | 4/2002 |
| FR | 2920135 A1 | 2/2009 |

OTHER PUBLICATIONS

EP Patent Application No. 16178804.7-1607, EP SR, dated Dec. 9, 2016, 7 pages.

Primary Examiner — Gregory J Strimbu
(74) Attorney, Agent, or Firm — Cantor Colburn LLP

(57) ABSTRACT

A pressure relief door (PRD) assembly includes a PRD frame, a PRD coupled to the PRD frame, a latch element configured to remain in a latched condition to maintain the PRD in a closed condition relative to the PRD frame and to assume an unlatched condition to permit the PRD to assume an open condition relative to the PRD frame in accordance with an occurrence of a burst duct event within the PRD frame and a retention element. The retention element is configured to automatically activate responsive to the PRD opening. The retention element includes an end disposable between the PRD and the PRD frame with the retention element automatically activated to provide positive interference to maintain the PRD in the open condition.

6 Claims, 4 Drawing Sheets

(51) Int. Cl.
*F02C 7/00* (2006.01)
*F02C 7/32* (2006.01)

(56) References Cited

U.S. PATENT DOCUMENTS

| | | | | |
|---|---|---|---|---|
| 5,623,820 A * | 4/1997 | Balzer | ............... | B64D 27/00 |
| | | | | 60/39.091 |
| 5,765,883 A * | 6/1998 | Dessenberger | ........ | B64D 29/06 |
| | | | | 292/240 |
| 6,513,841 B1 | 2/2003 | Jackson | | |
| 8,060,982 B2 * | 11/2011 | Magoz | ............... | E05F 5/04 |
| | | | | 16/82 |
| 8,439,308 B2 | 5/2013 | Armstrong et al. | | |
| 8,480,355 B2 | 7/2013 | Lore et al. | | |
| 8,529,196 B2 | 9/2013 | Lore et al. | | |
| 8,734,211 B2 * | 5/2014 | Tuchimaa | ............. | B64C 1/1446 |
| | | | | 137/511 |
| 8,740,147 B2 * | 6/2014 | Defrance | ............... | B64D 29/06 |
| | | | | 244/129.4 |
| 8,919,829 B2 * | 12/2014 | Hernandez | ............ | B64D 29/06 |
| | | | | 292/228 |
| 9,120,577 B1 * | 9/2015 | Baic | ............... | B64D 29/06 |
| 2002/0195827 A1 * | 12/2002 | Jackson | ............... | B64D 29/06 |
| | | | | 292/219 |
| 2003/0066930 A1 * | 4/2003 | Pratt | ............... | B64C 1/1469 |
| | | | | 244/118.5 |
| 2011/0240137 A1 * | 10/2011 | Vauchel | ............... | B64D 29/00 |
| | | | | 137/15.2 |
| 2013/0292515 A1 * | 11/2013 | Sommerer | ............ | B64C 1/1461 |
| | | | | 244/129.5 |

* cited by examiner

PRESSURE RELIEF DOOR ASSEMBLY

BACKGROUND OF THE DISCLOSURE

The subject matter disclosed herein relates to a pressure relief door assembly and, more particularly, to a pressure relief door assembly for burst duct detection.

Modern aircraft, such as commercial jets, include a fuselage that is formed to define a cabin and a cockpit and which has a nose cone section and a tail section, wings extending outwardly from the fuselage and a tail at the tail section of the fuselage. Thrust for the aircraft is generated by engines that are positioned within engine nacelles and typically either attach to the undersides of the wings, or the sides of the fuselage near the rear of the plane, or are built into the tail. The engines include an air inlet, a compressor to compress inlet air, a combustor in which fuel is mixed with compressed inlet air and combusted to produce a working fluid and a turbine in which the working fluid is expanded. The engines further include an outlet through which the working fluid is exhausted to generate the thrust.

The engine nacelles may include an inner fixed structure (IFS), which generally surrounds and provides an aerodynamic fairing for the engine and certain auxiliary devices including ducts that carry fluids to and from the engine sections and auxiliary devices and to the airplane. The engine nacelles further include several structures disposed radially outwardly of the IFS, some of which help define, along with the inner fixed structure, a duct for fan bypass air in a turbofan engine. The IFS may include one or more pressure relief doors.

A failure mode of compressed air ducts associated with the engine can occur when one or more ducts bursts in a "burst duct event." When this occurs, the pressure relief door will open automatically due to its latch being triggered to relieve overpressure in the compartment formed around the engine by the IFS to prevent structural damage. If a burst duct event does occur, the burst duct event needs to be identified so that appropriate inspections and any necessary repairs can be accomplished.

Currently, burst duct events can be identified by degraded engine performance expressed by the cockpit instruments but, since degraded engine performance expressed by the cockpit instruments does not always lead to identification of the burst duct event, a visual means of detection is often needed as a primary detection means or as a backup means. Often, a burst duct event can be detected through a visual inspection of the nacelle and the pressure relief door by identifying that the pressure relief door has unlatched and opened. However, due to the location of some pressure relief doors generally being on the upper hemisphere of the engine nacelle, if a burst duct event occurs and the pressure relief door opens during flight, the pressure relief door may return to or close to its original position due to gravity, and therefore not allow for the burst duct event to be detected from an inspection of the pressure relief door.

BRIEF DESCRIPTION OF THE DISCLOSURE

According to one aspect of the disclosure, a pressure relief door (PRD) assembly is provided and includes a PRD frame, a PRD hinge-coupled to the PRD frame, a latch element configured to normally remain in a latched condition to maintain the PRD in a closed condition relative to the PRD frame and to assume an unlatched condition to permit the PRD to assume an open condition relative to the PRD frame in accordance with an occurrence of a burst duct event within the PRD frame and a retention element. The retention element is configured to automatically activate responsive to the PRD opening. The retention element includes an end disposable between the PRD and the PRD frame with the retention element automatically activated to provide positive interference directed to maintain the PRD in the open condition.

In accordance with additional or alternative embodiments, the retention element includes a first frame element affixed to the PRD, a second frame element affixed to the PRD frame and an elastic element. The elastic element is coupled to one of the first and second frame elements such that the end is elastically biased against the other of the first and second frame elements in a non-interfering position with the PRD in the closed condition and disposable in an interference position between the PRD and the PRD frame with the PRD in the open condition.

In accordance with additional or alternative embodiments, the first and second frame elements are misaligned.

In accordance with additional or alternative embodiments, the first and second frame elements include L-shaped brackets.

In accordance with additional or alternative embodiments, the elastic element includes a leaf spring.

In accordance with additional or alternative embodiments, the elastic element includes bent flanges extending along a portion of the end.

According to another aspect of the disclosure, a pressure relief door (PRD) assembly is provided and includes a PRD frame, a PRD hinge-coupled to the PRD frame, a latch element configured to normally remain in a latched condition to maintain the PRD in a closed condition relative to the PRD frame and to assume an unlatched condition to permit the PRD to assume an open condition relative to the PRD frame in accordance with an occurrence of a burst duct event within the PRD frame, frame elements affixed to the PRD and the PRD frame and an elastic element. The elastic element is coupled to one of the frame elements to be elastically biased against the other of the frame elements in a non-interfering position with the PRD in the closed condition and disposable in an interference position between the PRD and the PRD frame with the PRD in the open condition.

In accordance with additional or alternative embodiments, the first and second frame elements are misaligned.

In accordance with additional or alternative embodiments, the first and second frame elements include L-shaped brackets.

In accordance with additional or alternative embodiments, the elastic element includes a leaf spring.

In accordance with additional or alternative embodiments, the elastic element includes bent flanges.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a pressure relief door (PRD) assembly is provided for use with an engine nacelle of an aircraft or another suitable vehicle. The PRD assembly allows for a detection of a burst duct by maintaining the PRD in an open position after a burst duct event, until the PRD is reset and closed by a maintenance worker.

Figure 1:
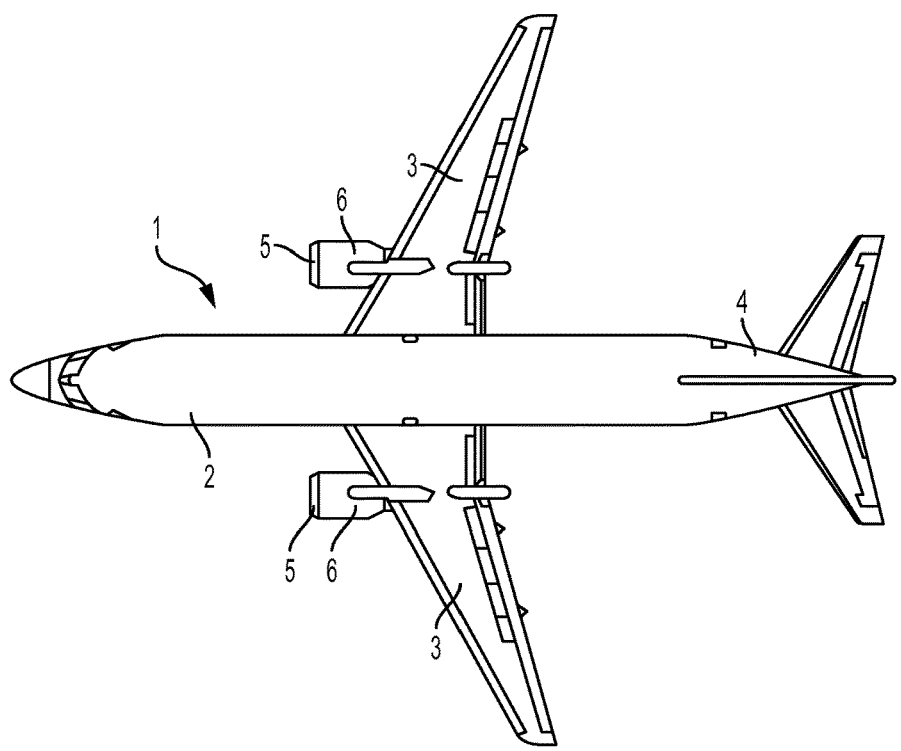
FIG. 1 is a top down illustration of an aircraft in accordance with embodiments.

With reference to FIG. 1, an aircraft 1 is provided. The aircraft 1 includes a fuselage 2, which has an aerodynamic nose cone and a trailing portion opposite the nose cone, wings 3 extending outwardly from the fuselage 2, a tail portion 4 at the trailing portion of the fuselage 2 and engines 5. The engines 5 are supported under the wings 3 and within engine nacelles 6. Other engine mounting locations for the engines 5 include the rear side of the fuselage 2. Alternatively, the engines 5 can be built into the tail portion 4.

Figure 2:
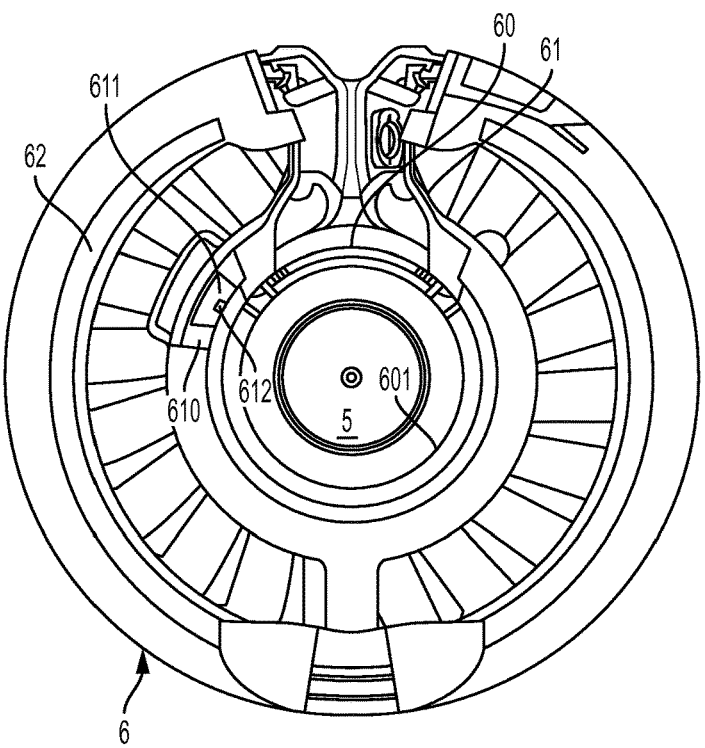
FIG. 2 is a view of an engine nacelle of the aircraft of FIG. 1 from the perspective of a viewer looking through the engine nacelle from a rear of the engine nacelle toward the forward direction.
Figure 3:
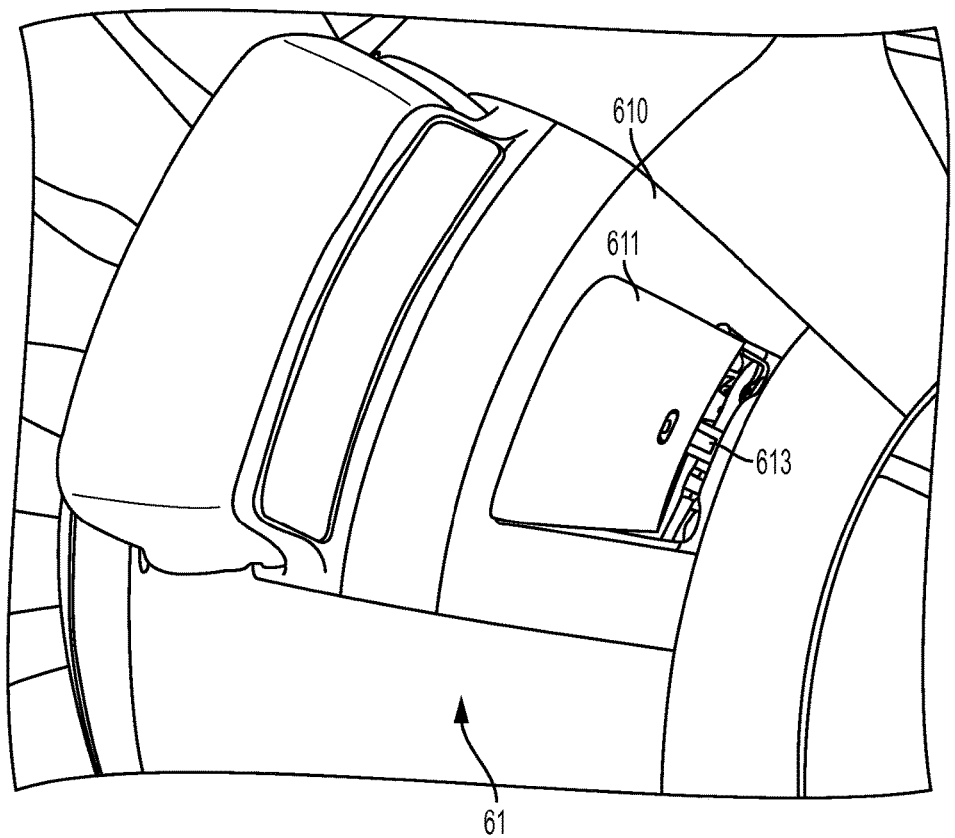
FIG. 3 is an enlarged version of a portion of the engine nacelle of FIG. 2.

With continued reference to FIG. 1 and with additional reference to FIGS. 2 and 3, the engine nacelles 6 each include an engine assembly 60, an inner fixed structure (IFS) 61 and an outer fixed structure (OFS) 62 that surrounds the IFS 61. For each engine nacelle 6, the IFS 61 forms an aerodynamic fairing around and provides a PRD frame for the engine assembly 60 and multiple compressed air ducts 601 associated with the engine assembly 60, along with several other auxiliary components, tubes, wire harnesses, etc.

The OFS 62 is disposed to surround the IFS 61 and may be provided as a generally annular element with an aerodynamic taper that narrows toward the trailing end of the engine nacelle 6. The IFS 61 includes an engine PRD frame 610, a PRD 611 that is hinge-coupled to the engine PRD frame 610 and a latch element 612. The engine PRD frame 610 can serve as a frame for the PRD 611 that attaches to the IFS 61 (i.e., a housing) or, in some cases, the PRD 611 can include a door and a hinge that attaches directly to the IFS 61. The latch element 612 may include a spring-loading 613 (see FIG. 3) and is configured to normally remain in a latched condition to thereby maintain the PRD 611 in a closed condition. However, the latch element 612 may also assume an unlatched condition to thereby permit the PRD 611 to assume an open condition in accordance with an occurrence of a burst duct event in any one or more of the multiple ducts 601 to relieve excess pressures.

Figure 4:
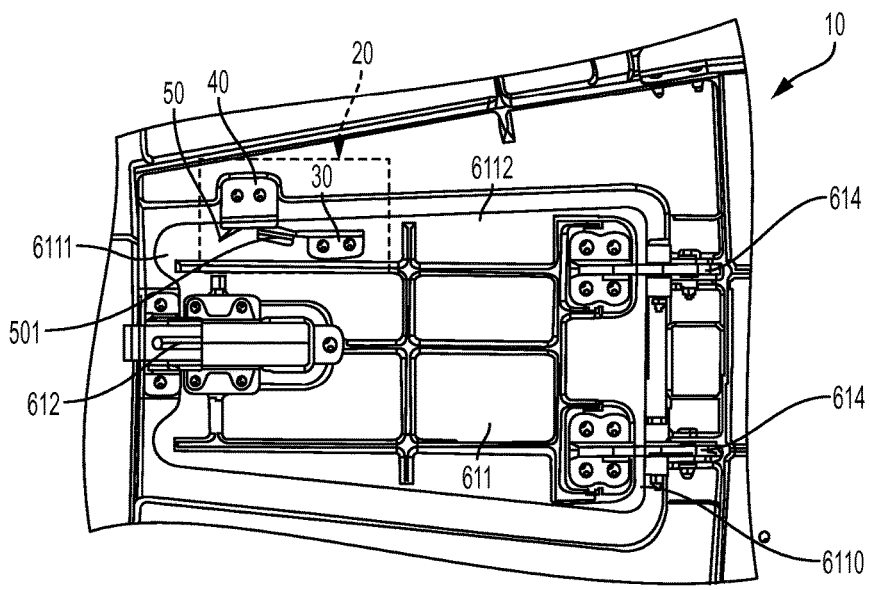
FIG. 4 is a view of a pressure relief door (PRD) of the engine nacelle of FIGS. 2 and 3 and of a PRD assembly in accordance with embodiments from the perspective of a viewer looking radially outwardly from inside the engine nacelle.

As shown in FIGS. 2-4, the PRD 611 is disposed in an upper hemisphere of the engine PRD frame 610. As such, if a burst duct event occurs at some point during the operation of the engine 5 or at some other point, the force of gravity will act upon the PRD 611 and cause the PRD 611 to tend to "fall" toward the latched condition, which would make detection of the burst duct event difficult during a normal inspection of the engine 5 and the engine nacelle 6. In fact, even if the PRD 611 remains open a little bit, it may be difficult for an operator to see because the PRD 611 is located on top of the IFS 61 (and inside of a dark duct), so a more obviously open PRD 611 would be helpful. To this end, each engine nacelle 6 further includes a PRD assembly 10 (see FIG. 4). The PRD assembly 10 includes a PRD retention element 20. The PRD retention element 20 is configured to automatically activate in an event the PRD 611 opens and is further configured to provide positive interference in a manner directed to maintain the PRD 611 in the open condition.

In accordance with embodiments, a single- or multiple-part hinge 614 may be provided proximate to a leading edge 6110 of the PRD 611 to thereby couple the PRD 611 to the engine PRD frame 610 such that the PRD 611 can pivot in an open condition about a hinge axis close to the leading edge 6110. Also, the latch element 612 may be disposed at a trailing edge 6111 of the PRD 611 and the PRD retention element 20 may be disposed at a lateral edge 6112 of the PRD 611. However, it is to be understood that this is not required and that other configurations are possible. These other configurations may include, but are not limited to, the latch element 612 and the PRD retention element 20 being disposed at other edges of the PRD 611 or the latch element 612 and the PRD retention element 20 being incorporated into a same device (e.g., a latch and retention element). With the above in mind, however, and for the purposes of clarity and brevity, the following description will only relate embodiments in which the latch element 612 and the PRD retention element 20 are disposed at the trailing and lateral edges 6111 and 6112, respectively.

Figure 5:
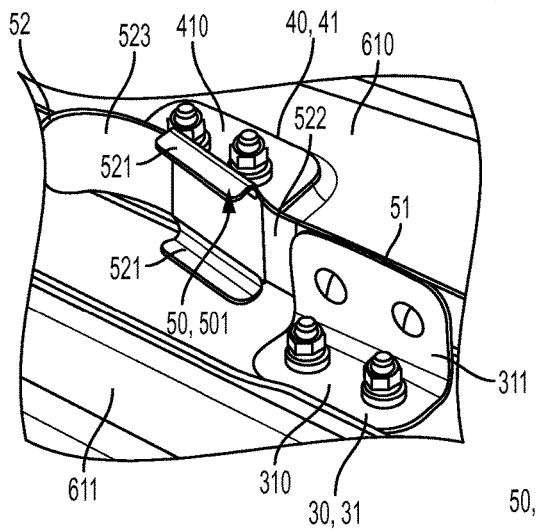
FIG. 5 is a perspective view of the PRD assembly of FIG. 4 in a non-interference position.
Figure 6:
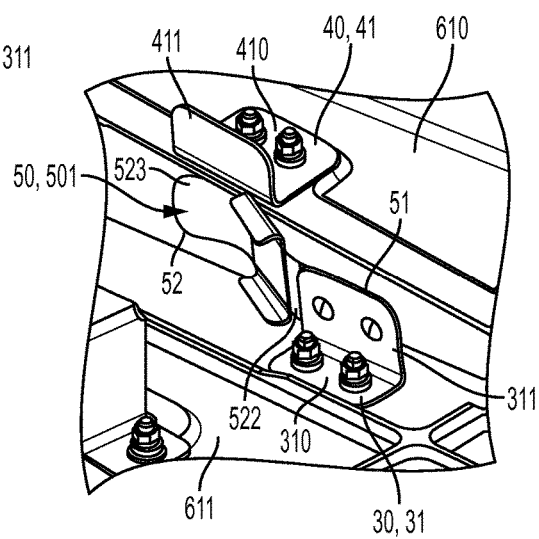
FIG. 6 is a perspective view of the PRD assembly of FIG. 4 in an interference position.

With continued reference to FIG. 4 and with additional reference to FIGS. 5 and 6, the PRD retention element 20 includes a first frame element 30, a second frame element 40 and an elastic element 50. The first frame element 30 is affixed to the PRD 611 and may be provided as an L-shaped bracket 31 with a first leg 310 that is fastened to a surface of the PRD 611 and a second leg 311 that protrudes away from a plane of the surface of the PRD 611. The second frame element 40 is affixed to the engine PRD frame 610 and may be provided as an L-shaped bracket 41 with a first leg 410 that is fastened to a surface of the engine PRD frame 610 and a second leg 411 that protrudes away from a plane of the surface of the engine PRD frame 610.

In accordance with embodiments, the respective surfaces of the PRD 611 and the engine PRD frame 610 may be substantially parallel such that the respective first legs 310, 410 of the first and second frame elements 30 and 40 are disposable at a similar plane with the PRD 611 in the closed condition. The respective second legs 311, 411 of the first and second frame elements 30 and 40 may be, but need not be, disposed in parallel with one another. In some embodiments, the second leg 411 of the second frame element 40 may be at least partially superimposed over a portion of the PRD 611.

In accordance with further embodiments, the first frame 30 and the second frame 40 may be axially misaligned with respect to one another and, with such a misaligned configuration, the elastic element 50 may be provided as a leaf spring 501 that is substantially as wide as the height of the respective second legs 311, 411 of the first and second frame elements 30 and 40. The elastic element 50 has a first end 51 and a second end 52. The elastic element 50 is coupled to one of the first and second frame elements 30 and 40 at the first end 51 such that the second end 52 extends distally toward the other of the first and second frame elements 30 and 40 (for purposes of clarity and brevity, the following description will relate to the case in which the first end 51 is coupled to the second leg 311 of the first frame element 30 and that the second end 52 extends distally toward the second frame element 40). The second end 52 includes bent flanges 521 on either lateral side thereof and further includes generally continuous first and second curves 522, 523 that provide the elastic element with a predefined elasticity.

The second end 52 is thus elastically biased against the second leg 411 of the second frame element 40 in a non-PRD-interfering position with the PRD 611 in the closed condition (see FIG. 5). Here, it is noted that since at least the second leg 411 of the second frame element 40 is superimposed over the portion of the PRD 611, the second end 52 is maintained in a superimposed position over the PRD 611 and in a non-superimposed position with respect to the engine PRD frame 610 and thus does not impede movement of the PRD 611 from the closed condition to the open position during a burst duct event.

By contrast, the second end 52 is disposable in a PRD-interference position between the PRD 611 and the engine PRD frame 610 with the PRD 611 in the open condition. That is, once the PRD 611 moves into the open condition, the second end 52 passes away from the second leg 411 and is no longer prevented from elastically extending into the PRD interference position between the PRD 611 and the engine PRD frame 610 (see FIG. 6). In this position, the bent flanges 521 impinge against the interior surface of the PRD 611 and the outer surface of the engine PRD frame 610.

Figure 7:
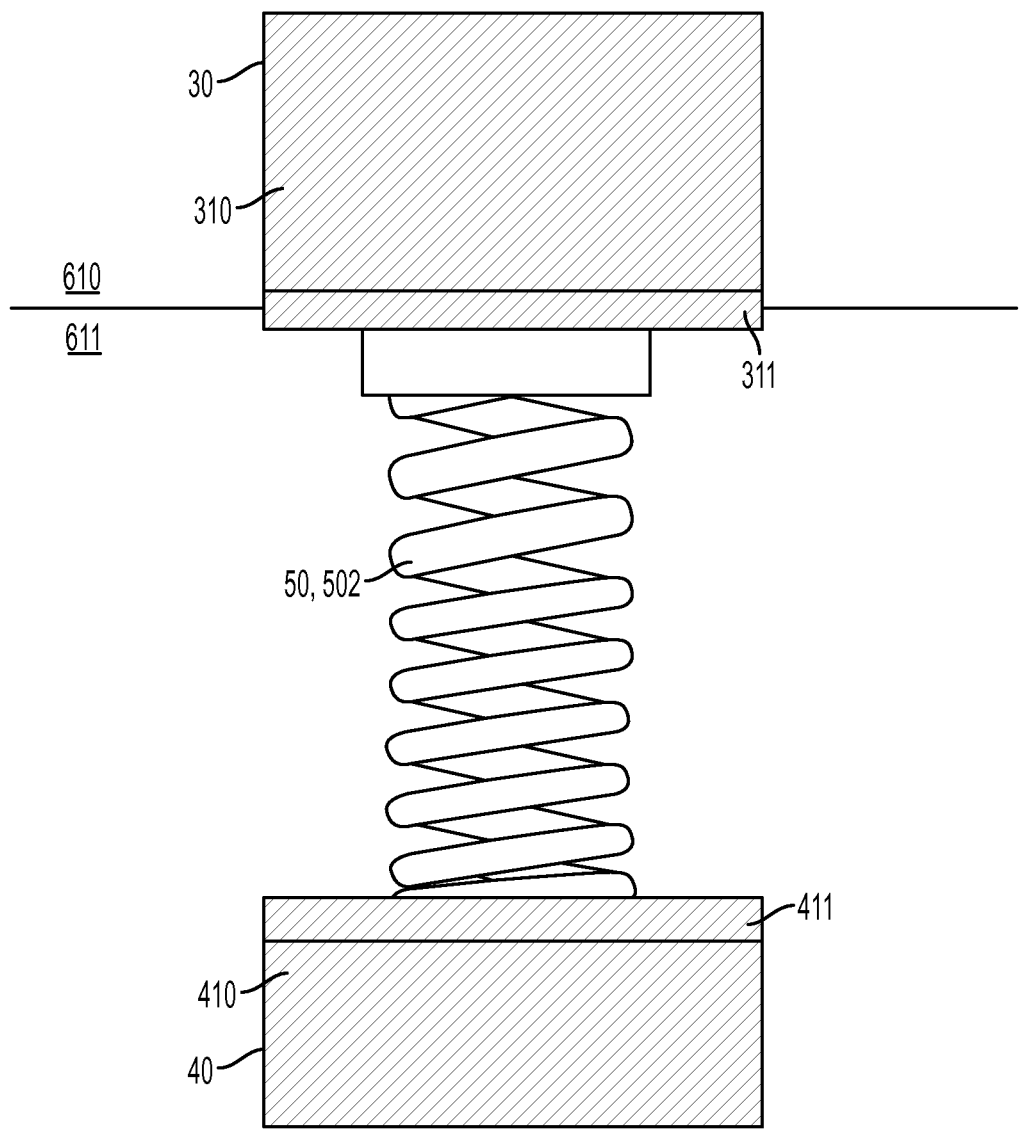
FIG. 7 is a schematic diagram illustrating a PRD assembly in accordance with alternative embodiments.

In accordance with alternative embodiments and, with reference to FIG. 7, the first and second frame elements 30 and 40 may be axially aligned with respect to one another. In this case, the elastic element 50 may be provided as a compression spring 502 that extends along a substantially straight line in the closed and open conditions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

I claim:

1. A pressure relief door assembly, comprising:
    a frame;
    a pressure relief door coupled to the frame;
    a latch element configured to remain in a latched condition to maintain the pressure relief door in a closed condition relative to the frame and to assume an unlatched condition to permit the pressure relief door to assume an open condition relative to the frame in accordance with an occurrence of a burst duct event within the frame; and
    a retention element configured to automatically activate responsive to an opening of the pressure relief door,
    the retention element including an end to which a bias is applied such that the end is biased to translate in a biasing direction which is transversely oriented relative to a direction of translation of the pressure relief door during the opening of the pressure relief door, and
    the end being disposable due to the bias between the pressure relief door and the frame with the retention element automatically activated to provide positive interference to maintain the pressure relief door in the open condition.

2. The pressure relief door assembly according to claim 1, wherein the retention element comprises:
    a first frame element affixed to the pressure relief door;
    a second frame element affixed to the frame; and
    an elastic element coupled to one of the first and second frame elements to apply the bias such that the end is:
    elastically biased in the biasing direction against the other of the first and second frame elements in a non-interfering position with the pressure relief door in the closed condition, and
    disposable in an interference position between the pressure relief door and the frame with the pressure relief door in the open condition.

3. The pressure relief door assembly according to claim 2, wherein the first and second frame elements are misaligned with one another along an edge of the pressure relief door.

4. The pressure relief door assembly according to claim 2, wherein the first and second frame elements comprise L-shaped brackets.

5. The pressure relief door assembly according to claim 2, wherein the elastic element comprises a leaf spring.

6. The pressure relief door assembly according to claim 2, wherein the elastic element comprises bent flanges extending along a portion of the end.

\* \* \* \* \*